(12) United States Patent
Lynch et al.

(10) Patent No.: US 11,666,842 B2
(45) Date of Patent: Jun. 6, 2023

(54) DEVICE THAT SELECTIVELY DELIVERS MOLECULAR ACTIVE COMPONENTS AND REDUCES AIRBORNE CONTAMINANTS

(71) Applicants: Iyam Lynch, Clemmons, NC (US); Stephen Dellinger, Spruce Pine, NC (US); Eric Grindley, Cary, NC (US); Ken So, Duarte, CA (US)

(72) Inventors: Iyam Lynch, Clemmons, NC (US); Stephen Dellinger, Spruce Pine, NC (US); Eric Grindley, Cary, NC (US); Ken So, Duarte, CA (US)

(*) Notice: Subject to any disclaimer, the term of this patent is extended or adjusted under 35 U.S.C. 154(b) by 0 days.

(21) Appl. No.: 16/464,022

(22) PCT Filed: Jan. 15, 2018

(86) PCT No.: PCT/US2018/013739
§ 371 (c)(1),
(2) Date: May 24, 2019

(87) PCT Pub. No.: WO2018/098508
PCT Pub. Date: May 31, 2018

(65) Prior Publication Data
US 2019/0381433 A1    Dec. 19, 2019

Related U.S. Application Data

(60) Provisional application No. 62/426,697, filed on Nov. 28, 2016.

(51) Int. Cl.
| | |
|---|---|
| *B01D 39/20* | (2006.01) |
| *B01D 39/16* | (2006.01) |
| *A24F 7/04* | (2006.01) |
| *B01D 46/12* | (2022.01) |

(52) U.S. Cl.
CPC ..... *B01D 39/2017* (2013.01); *B01D 39/1653* (2013.01); *A24F 7/04* (2013.01); *B01D 46/12* (2013.01)

(58) Field of Classification Search
CPC . B01D 39/2017; B01D 39/1653; B01D 46/12
USPC .......................................................... 55/484
See application file for complete search history.

(56) References Cited

U.S. PATENT DOCUMENTS

| | | | |
|---|---|---|---|
| 2,274,889 A * | 3/1942 | Cullen | A24F 1/00 131/202 |
| 3,250,280 A | 5/1966 | Hu | |
| 5,285,798 A * | 2/1994 | Banerjee | A24B 15/24 131/194 |
| 7,513,258 B2 | 4/2009 | Kollasch et al. | |

(Continued)

FOREIGN PATENT DOCUMENTS

| | | | |
|---|---|---|---|
| WO | WO-2015187986 A1 * | 12/2015 | ............. A62B 18/02 |
| WO | WO 2016/077338 | 5/2016 | |

OTHER PUBLICATIONS

International Search Report and Written Opinion prepared by the ISA/US dated Apr. 16, 2018, for International Application No. PCT/US2018/13739.

*Primary Examiner* — Robert A Hopkins
*Assistant Examiner* — Qianping He
(74) *Attorney, Agent, or Firm* — Sheridan Ross P.C.

(57) ABSTRACT

Described herein are devices and components for same, e.g., filters cartridges, which are able to filter contaminants while allowing active ingredients, e.g., nicotine, to pass through.

20 Claims, 14 Drawing Sheets

(56) References Cited

U.S. PATENT DOCUMENTS

Figure 1:
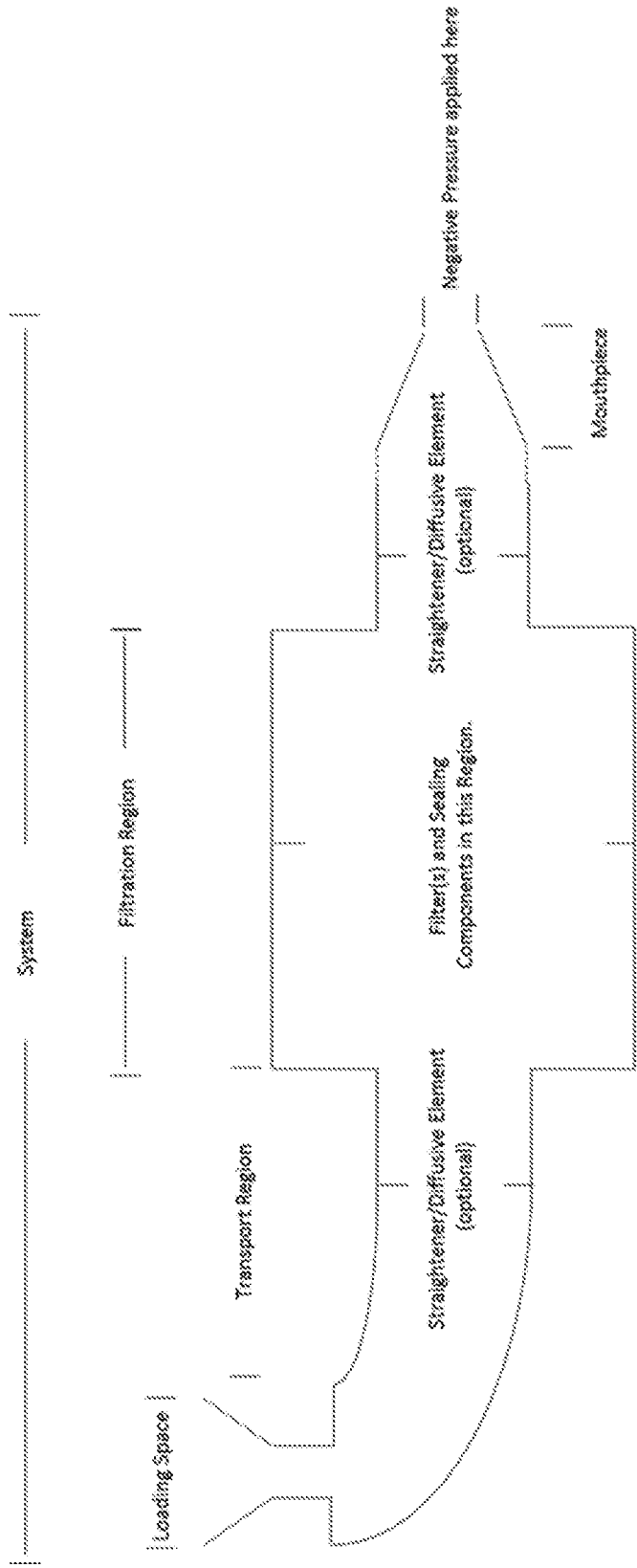

| | | | |
|---|---|---|---|
| 8,747,533 B1* | 6/2014 | Ekanayake | B01D 46/0086 |
| | | | 96/417 |
| 2005/0144916 A1* | 7/2005 | Adamek | B01D 29/213 |
| | | | 55/484 |
| 2007/0204868 A1* | 9/2007 | Bollinger | A24F 13/00 |
| | | | 131/330 |
| 2007/0209343 A1 | 9/2007 | Cuvelier | |
| 2007/0283971 A1 | 12/2007 | Gidding | |
| 2009/0065011 A1* | 3/2009 | Maeder | A24D 1/22 |
| | | | 131/194 |
| 2011/0073120 A1* | 3/2011 | Adamic | A24F 13/06 |
| | | | 131/202 |
| 2011/0232481 A1* | 9/2011 | Worrilow | B01D 53/007 |
| | | | 95/10 |
| 2012/0019110 A1* | 1/2012 | Ono | B25J 21/02 |
| | | | 312/1 |
| 2012/0144790 A1* | 6/2012 | Cambo | B01D 39/1692 |
| | | | 55/486 |
| 2013/0186179 A1* | 7/2013 | Osborne | B01D 39/1692 |
| | | | 96/9 |
| 2013/0340613 A1* | 12/2013 | Krupnikov | B01D 53/02 |
| | | | 264/413 |
| 2015/0290561 A1* | 10/2015 | Barsness | B01D 29/111 |
| | | | 493/405 |
| 2016/0317693 A1 | 11/2016 | Greist | |
| 2016/0331024 A1* | 11/2016 | Cameron | A24F 40/50 |

* cited by examiner

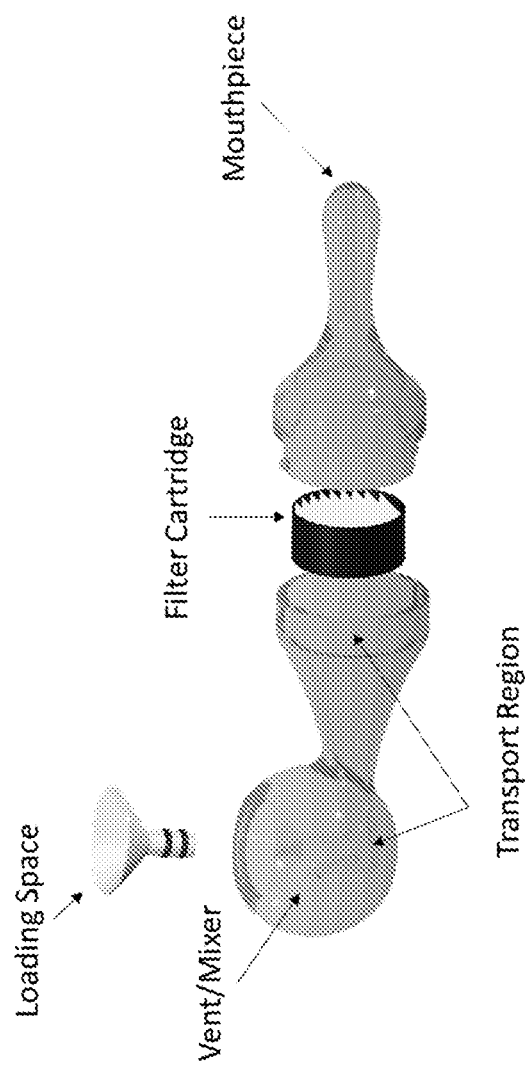
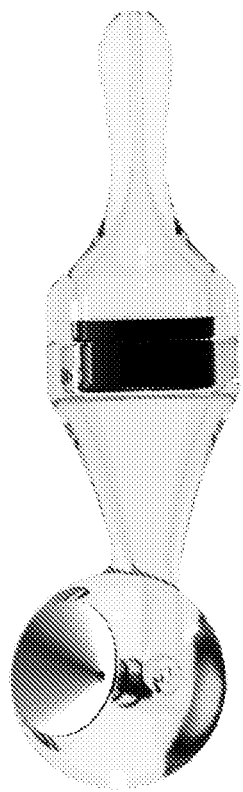

Figure 8A

Smoking through 1 inch flat sheet (surface area = 5.07 cm^2) samples

| Type of Media | % filtration draws | Number of draws | Resistance (qualitative) | Smoke Level (qualitative) | Heat Index (qualitative) | Notes |
|---|---|---|---|---|---|---|
| N95 | 95 | ~3 | Low | High (very visible) | Harsh in throat | Seems like the smoke sticks throughout the entire thickness of the filter. After use, the color of the filter is dramatic. |
| N95 | 95 | ~3 | Low | High (very visible) | Harsh in throat | Seems like the smoke sticks throughout the entire thickness of the filter. After use, the color of the filter is dramatic. |
| ULPA | 99.9995 | ~3 | Medium | Slight (visible but low) | Harsh in throat | Smoke sticks on the surface but is not very dark. |
| HEPA | 99.97 | ~3 | Medium-Low | Medium (quite visible) | Harsh in throat | Glass media, charged but may have disappeared, darker color on the white filter |
| ULPA | 99.9999 | 1 | High | Low (not visible) | Only slightly warm | Extremely hard to breath through after about 2-5 seconds of breathing in. Cannot breath through afterward. |
| ULPA | 99.9999 | 1 | High | Low (not visible) | Only slightly warm | Extremely hard to breath through after about 2-5 seconds of breathing in. Cannot breath through afterward. |
| ULPA | 99.9995 | ~3 | Medium | Slight (visible but low) | Harsh in throat | Filter gets extremely dark. Very noticable. Might be charged but has lost charge possibly. |
| ULPA | 99.9995 | 2 | High | Hot | | The prefilter on the media gets dark from the smoke. |
| HEPA | 99.97 | 3 | High | Low (not visible) | Hot | Filter gets slightly brown from smoke. |

Figure 8B

Smoking through 2 inch flat sheet (surface area = 20.27 cm^2 ) samples

| Type of Media | % filtration | Number of draws | Resistance (qualitative) | Smoke Level (qualitative) | Heat index (qualitative) | Notes |
|---|---|---|---|---|---|---|
| ULPA | 99.9995 | ~3 | Medium | Slight visible | Harsh in throat | Media is very fragile and can rip. Surface gets brown but not dark. |
| MERV0 (Wetlaid Carbon) | 1 | ~3 | Medium | High (very visible) | Low | No filtration for particulate. Taste was changed for the better, less burnt taste. Very cool, may be because of high surface area. |
| HEPA | 99 | ~3 | Medium | Slight (visible but low) | Harsh in throat | Light brown color on filter. Media is very thick and hard to bend. Some large particulate (1mm) stuck to the filter and did not burn the media. |
| HEPA | 99 | ~3 | Low | Medium (quite visible) | Harsh in throat | Same as above but could have a leak. |
| N95 | 95 | ~3 | Low | Medium (quite visible) | Harsh in throat | Filter browns a bit. Could be used as prefilter. |
| ULPA | 99.9999 | ~3 | Low | Low (not visible) | Hot | Media browns slightly. Potential system use. Too much resistance for a single session. Excellent filtration qualities. |
| ULPA | 99.9999 | 2 | Medium | Slight (visible but low) | Harsh in throat | |
| HEPA | 99.97 | ~3 | Low | Low (not visible) | Harsh in throat | Filter slightly browns. Could be used multiple sessions. |
| HEPA | 99.97 | ~3 | Low | Low visible | Harsh in throat | Filter slightly browns. Could be used multiple sessions. |

Figure 9

| | All Samples Tested with ATI 3 Automated Filter Tester | | | | |
|---|---|---|---|---|---|
| Filter Type | Sample # | % Penetration | Efficiency % | Resistance(mmH20) | Flow(L/min) |
| HEPA glass | 1 | 0.0299 | 99.9701 | 52.8 | 14.9 |
| HEPA glass | 2 | 0.0299 | 99.9701 | 58.4 | 14.9 |
| HEPA glass | 3 | 0.0294 | 99.9706 | 56.2 | 14.9 |
| HEPA glass | 4 | 0.0293 | 99.9707 | 55.4 | 14.9 |
| HEPA glass | 5 | 0.0297 | 99.9703 | 58 | 14.9 |
| HEPA glass | 6 | 0.0296 | 99.9704 | 55.7 | 14.9 |
| ULPA | 1 | 0.0007 | 99.9993 | 92.7 | 14.8 |
| ULPA | 2 | 0.0008 | 99.9992 | 79 | 14.8 |
| ULPA | 3 | 0.0005 | 99.9995 | 88.7 | 14.8 |
| ULPA | 4 | 0.0005 | 99.9995 | 82.3 | 14.8 |
| ULPA | 5 | 0.0005 | 99.9995 | 84.6 | 14.8 |
| ULPA | 6 | 0.0005 | 99.9995 | 92.1 | 14.8 |
| Sub HEPA | 1 | 5.9766 | 94.0234 | 28.4 | 14.9 |
| Sub HEPA | 2 | 5.017 | 94.983 | 34 | 15 |
| Sub HEPA | 3 | 5.8651 | 94.1349 | 31.4 | 14.9 |
| Sub HEPA | 4 | 5.6309 | 94.3691 | 31.2 | 15 |
| Sub HEPA | 5 | 5.9132 | 94.0868 | 30.1 | 15 |
| Sub HEPA | 6 | 5.3508 | 94.6492 | 27.5 | 15 |
| HEPA membrane | 1 | 0.0022 | 99.9978 | 22.7 | 14.9 |
| HEPA membrane | 2 | 0.0018 | 99.9982 | 18.7 | 14.9 |
| HEPA membrane | 3 | 0.003 | 99.997 | 20.8 | 14.9 |
| HEPA membrane | 4 | 0.0006 | 99.9994 | 21.8 | 14.9 |
| HEPA membrane | 5 | 0.0013 | 99.9987 | 23.5 | 14.9 |
| HEPA membrane | 6 | 0.0013 | 99.9987 | 20.1 | 14.9 |

DEVICE THAT SELECTIVELY DELIVERS MOLECULAR ACTIVE COMPONENTS AND REDUCES AIRBORNE CONTAMINANTS

CROSS REFERENCE TO RELATED APPLICATION

This application is a national stage application under 35 U.S.C. 371 and claims the benefit of PCT Application No. PCT/US2018/013739 having an international filing date of 15 Jan. 2018, which designated the United States, which PCT application claimed the benefit of priority under 35 U.S.C. § 119(e) to U.S. Provisional Patent Application No. 62/426,697, filed 28 Nov. 2016, the entire disclosures of each of which are incorporated herein by reference.

TECHNICAL FIELD

Aspects of the present disclosure relate to bulk particulate filtration, gaseous filtration, and molecular delivery of the active components particularly from smoking.

BACKGROUND

The health risks of fine airborne particulate matter such as "PM10" and "PM2.5" are well known and documented. The airborne particulate matter generated from smoking is particularly dangerous and has been shown to increase the likelihood of diseases such as cancer, lung disease (such as COPD), asthma, stroke, cardiovascular disease, etc. to name a few. It is well known that a percentage of the active components or "molecules of interest" exist freely in the smoke independent of "riding" on larger smoke particulates. A portion of these freely existing molecules in the smoke are considered volatile organic compounds or "VOCs" and consists of the active component(s) (or molecule(s) of interest) of the smoked substance. Conventional smoking and "vaping" puts the user at great health risks due to the excessive amounts of fine and ultrafine particulate matter that is inhaled while smoking. In recent years new technologies have been created to provide a safer smoking experience by reducing the unwanted by-products of conventional smoking.

One recent invention is a pipe that has been made to incorporate the use of an activated carbon filter that claims to remove tar from the smoke. Unfortunately, the use of an activated carbon filter alone is not enough to remove all of the fine and ultrafine particles. Another such innovation is the use of vaporizers which are believed to greatly reduce the exposure to harmful substances produced by conventional smoking. The amount of reduction from the use of vaporizers can vary from brand to brand and as a result of this and other factors (such as increased exposure to airborne propylene glycol PG and ultrafine particulates) there is a continued need for further reduction from the exposure to harmful substances that are generated from smoking.

Additional examples may be found in U.S. Pat. No. 7,513,258 B2 to Kollasch and Teys; US20070204868 A1 to Bollinger and Digney-Peer; US20070283971 A1 to Gidding; and US20110073120 A1 to Adamic all are illustrative of such technologies. While these units may be suitable for the particular purpose to which they address, they would not be as suitable for the purposes of the present invention as heretofore described. It is with these observations in mind, among others, that various aspects of the present disclosure were conceived and developed.

SUMMARY

Implementations described and claimed herein address the foregoing problems by providing devices and methods for selectively delivering molecular active components from bulk airborne substances. It is understood that the selective delivery of molecular active components from bulk airborne substances is not limited to the smoking application/configuration and can be applied to other implementations where such a delivery method is needed.

Described herein is a filter cartridge for the selective delivery of molecular active components from bulk airborne substances, useful in smoking applications, wherein the filter cartridge comprises a pleated flat sheet comprising filter material. In some embodiments, the filter material is selected from a HEPA filter, e.g., a sub HEPA filter, N95 material, ULPA material, HEPA glass, and a combination thereof. In some embodiments, the pleated flat sheet comprises a pleat density of 11 pleats/inch and a pleat height of 0.6 inches. In some embodiments, the pleated flat sheet comprises a pleat density of 15 pleats/inch and a pleat height of 0.5 inches. In some embodiments, the filter cartridge comprises HEPA glass, ULPA filter, and/or a Sub-HEPA filter flat sheet pleated to a pleat density of 11 pleats/inch and a pleat height of 0.6 inches. In some embodiments, the filter cartridge comprises a HEPA membrane pleated to a pleat density of 15 pleats/inch and a pleat height of 0.5 inches. In some embodiments, the filter cartridge further comprises a carbon filter, e.g., a wet-laid carbon filter, wherein the carbon filter is upstream of the pleated flat sheet.

Generally, a device for selectively delivering molecular active components from bulk airborne substances as described herein, e.g., a smoking apparatus, comprises (1) a loading space/chamber (e.g., for inserting the smoked substance), (2) a first transport region downstream of the loading space (e.g., a contained volume for transporting smoke or vapor to the user), (3) a filtration region comprising a filter cartridge (e.g., a filter cartridge as described herein), which filter cartridge comprises one or more filtration technologies (e.g., MERV rated prefiltration, HEPA filter, ULPA filter, activated carbon technology, water/liquid, sieving, condensation, etc.), (4) a second transport region downstream of the filtration region, and (5) a negative pressure generation system (such as: user inhalation, fan and blower, thermal gradient, pump, etc.). In some embodiments, the filtration region is downstream of the loading space and transport region and upstream the, and upstream of the negative pressure generation system. In some embodiments, the filtration region is upstream of the loading space. In some embodiments, the transport region may also comprise straightening and/or diffusive elements that provide laminar smoke transport and cooling as it is transported through the device. In some embodiments, the smoking apparatus comprises a straightening and/or diffusive element downstream of the filtration region. In some embodiments, the smoking apparatus comprises a straightening and/or diffusive element both within the transport region and downstream of the filtration region.

Generally, the smoking apparatus comprises a length $L_1$. The loading space comprises a first opening comprising a diameter $D_1$ that tapers down to a second opening comprising a diameter $D_2$. The first transport region comprises a length $L_2$ with a diameter $D_3$. The filtration region comprises a length $L_3$ and diameter $D_4$. The second transport region comprises a diameter $D_5 \pm D_6$ and a length of $L4 \pm L5$. In some embodiments, the smoking apparatus comprises dimensions for each of $L_1$-$L_5$ and $D_1$-$D_5$ within the dimension range provided in Table 1. In some embodiments, the smoking apparatus comprises the exemplary dimensions for each of $L_1$-$L_5$ and $D_1$-$D_6$ (without or without the straightening element) as provided in Table 1.

TABLE 1

| Smoking Apparatus (with or without straightening element(s)) | Dimension range | Exemplary Dimension |
|---|---|---|
| $L_1$ | 100 mm-235 mm | 150 mm |
| $L_2$ | 20 mm-50 mm | 30 mm |
| $L_3$ | 5 mm-70 mm | 40 mm |
| $L_4$ | 10 mm-25 mm | 20 mm |
| $L_5$ | 10 mm-25 m | 10 mm |
| $D_1$ | 10 mm-20 mm | 30 mm |
| $D_2$ | 1 mm-3 mm | 2 mm |
| $D_3$ | 6 mm-15 mm | 8 mm |
| $D_4$ | 6 mm-50 mm | 26 mm |
| $D_5$ | 6 mm-15 mm | 10 mm |
| $D_6$ | 3 mm-8 mm | 4 mm |
| Straightening Element | | |
| d | 6 mm-50 mm | 8 mm |
| l | 0.2 mm-60 mm | 18 mm |
| s | 0.5 mm-5 mm | 4 mm |
| t | 0.2 mm-1 mm | 0.5 mm |

In some embodiments, the loading space/chamber comprises a heating element, e.g., a heating coil, wire, resistive element, etc. for vaporizing the smoked substance. As such, described herein is a device for selectively delivering molecular active components from bulk airborne substances, e.g., a smoking apparatus, comprising (1) a loading space/chamber comprising a heating element for vaporizing the smoked substance, (2) a transport region downstream of the loading space (e.g., a contained volume for transporting smoke or vapor to the user, (3) a filtration region downstream and/or upstream of the loading space of the device, wherein the filtration region comprises a filter cartridge (e.g., a filter cartridge as described herein) comprising one or more filtration technologies (MERV rated prefiltration, HEPA filter, ULPA filter, activated carbon technology, water/liquid, sieving, condensation, etc.), and (4) a negative pressure generation system (such as: user inhalation, fan and blower, thermal gradient, pump, etc.). The transporting region may also include straightening and diffusive elements that provide laminar smoke transport and cooling as it is transported through the device. In some embodiments, the transport region may also comprise straightening and/or diffusive elements that provide laminar smoke transport and cooling as it is transported through the device. In some embodiments, the smoking apparatus comprises a straightening and/or diffusive element downstream of the filtration region. In some embodiments, the smoking apparatus comprises a straightening and/or diffusive element both within the transport region and downstream of the filtration region.

In another implementation, a device for selectively delivering molecular active components from bulk airborne substances includes a loading space for inserting the smoked substance, a contained volume for transporting smoke or vapor to the user, a filtration region downstream and/or upstream of the loading space, wherein the filtration region comprises a filter cartridge (e.g., a filter cartridge as described herein) comprising one or more filtration technologies (MERV rated prefiltration, HEPA filter, ULPA filter, activated carbon technology, water/liquid, sieving, condensation, etc.) at least one differential pressure sensor to measure the pressure drop across the filtration region to monitor the resistance/lifetime of the filter and/or an additional pressure sensor to quantify the flow rate of the system by measuring the pressure drop across a known fixed resistance (cone, orifice, etc.), a user interface for displaying relevant information such as data collected from the pressure sensors which includes filter lifetime and flowrate, and a negative pressure generation system (such as: user inhalation, fan and blower, thermal gradient, pump, etc.). The transporting region may also include straightening and diffusive elements that provide laminar smoke transport and cooling as it is transported through the device. It is understood in this implementation that the gas/vapor phase smoke can be transported through the system via positive pressure configuration and is not limited to the negative pressure configuration. The configuration may also include a Bluetooth chip to allow the device to display information to a Bluetooth compatible device such as a smart phone, laptop computer, tablet, etc. The recorded information from the device will be sent to the smartphone enabled device and viewed by the user via custom application installed on said device.

In another implementation, a device for selectively delivering molecular active components from bulk airborne substances includes a loading space/chamber for vaporizing the smoked substance (using a heating coil/wire or resistive element), a contained volume for transporting smoke or vapor to the user, a filtration region downstream and/or upstream of the loading space of the device that incorporates a variety of individual and/or combinations of the a variety of filtration technologies (MERV rated prefiltration, HEPA, ULPA, activated carbon technology, water/liquid, sieving, condensation, etc.), at least one differential pressure sensor to measure the pressure drop across the filtration region to monitor the resistance/lifetime of the filter and/or an additional pressure sensor to quantify the flow rate of the system by measuring the pressure drop across a known fixed resistance (cone, orifice, etc.), a user interface for displaying relevant information such as data collected from the pressure sensors which includes filter lifetime and flowrate, and a negative pressure generation system (such as: user inhalation, fan and blower, thermal gradient, pump, etc.). The transporting region may also include straightening and diffusive elements that provide laminar smoke transport and cooling as it is transported through the device. It is understood in this implementation that the gas/vapor phase smoke can be transported through the system via positive pressure configuration and is not limited to the negative pressure configuration. The configuration may also include a Bluetooth chip to allow the device to display information to a Bluetooth compatible device such as a smart phone, laptop computer, tablet, etc. The recorded information from the device will be sent to the smartphone enabled device and viewed by the user via custom application installed on said device.

In another implementation, a device for selectively delivering molecular active components from bulk airborne substances includes a loading space for inserting the smoked substance, a contained volume for transporting smoke or vapor to the user, a filtration region downstream and/or upstream of the loading space of the device that incorporates a variety of individual and/or combinations of the a variety of filtration technologies (MERV rated prefiltration, HEPA, ULPA, activated carbon technology, water/liquid, sieving, condensation, etc.), a condensation chamber for converting the airborne molecular active components into liquid form for extraction, and a negative pressure generation system (such as: user inhalation, fan and blower, thermal gradient, pump, etc.). The transporting region may also include straightening and diffusive elements that provide laminar smoke transport and cooling as it is transported through the device. It is understood in this implementation that the gas/vapor phase smoke can be transported through the system via positive pressure configuration and is not limited to the negative pressure configuration.

In another implementation, a device for selectively delivering molecular active components from bulk airborne substances includes a loading space for inserting the smoked substance, a contained volume for transporting smoke or vapor to the user, a filtration region downstream and/or upstream of the loading space of the device that incorporates a variety of individual and/or combinations of the a variety of filtration technologies (MERV rated prefiltration, HEPA, ULPA, activated carbon technology, water/liquid, sieving, condensation, etc.), at least one differential pressure sensor to measure the pressure drop across the filtration region to monitor the resistance/lifetime of the filter and/or an additional pressure sensor to quantify the flow rate of the system by measuring the pressure drop across a known fixed resistance (cone, orifice, etc.), a user interface for displaying relevant information such as data collected from the pressure sensors which includes filter lifetime and flowrate, a condensation chamber for converting the airborne molecular active components into liquid form for extraction, and a negative pressure generation system (such as: user inhalation, fan and blower, thermal gradient, pump, etc.). The transporting region may also include straightening and diffusive elements that provide laminar smoke transport and cooling as it is transported through the device. It is understood in this implementation that the gas/vapor phase smoke can be transported through the system via positive pressure configuration and is not limited to the negative pressure configuration. The configuration may also include a Bluetooth chip to allow the device to display information to a Bluetooth compatible device such as a smart phone, laptop computer, tablet, etc. The recorded information from the device will be sent to the smartphone enabled device and viewed by the user via custom application installed on said device.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF FIGURES

FIG. 1 is a illustrative not to scale depiction of an apparatus comprising a loading space, first transport region, a filter and sealing region optionally flanked on either side by a straightener/diffusive element, a second transport region downstream the filtration region, and the mouthpiece through which negative pressure may be applied for inhalation of the active ingredient.

FIG. 2 provides non-limiting exemplary dimensions of the entire apparatus and each of the components (loading space, first transport region, filter and sealing region, second transport region each optional straightener/diffusive element, and mouthpiece).

FIG. 3 provides non-limiting and exemplary dimensions for the straightening/diffusive element.

FIG. 4 provides illustrative not to scale exemplary filter configurations (pleated and/or unpleated) of the filtration region in the disclosed invention.

FIG. 5 provides a graph of various filter face velocities (cm/s; y-axis) as a function of flow rate (x-axis; l/min) for a 2-inch or a 1-inch diameter HEPA glass flat sheet.

FIGS. 6A-6B provides 3-D illustrative rendering, not to scale, of a smoking apparatus as described herein further comprising a vent/mixer upstream of the transport region, (A) with each component separated or (B) fully constructed.

FIGS. 7A and 7B show the penetration (%; y-axis) of differently sized particles. FIG. 7A shows the maximum penetration as a function of particle size/droplet size of a challenge aerosol. The challenge aerosol for this graph specifically was Dioctyl Phthalate (DOP). The plot shows (looking right to left) that it is easier for smaller particles to penetrate the filter. The trend is not linear due to the different type of trapping mechanisms involved in stopping the particles. The particle size that is hardest for the filter to stop (highest penetration %) is called the most penetrating particle size or "MPPS" which in many HEPA filters is close to 0.3 microns (300 nm). The 5 different curves shown on the figure are 5 separate maximum penetration tests on the same filter material but performed at different flow speeds. The graph shows (as intuitively expected) that at higher flow speeds it is easier to penetrate the filter (higher overall penetration %) than at lower flow speeds. FIG. 7B shows the maximum penetration as a function of face velocity (directly proportional to flow speed) of a challenge aerosol. The challenge aerosol for this graph specifically was Dioctyl Phthalate (DOP). The graph shows (as intuitively expected) that at higher flow speeds it is easier to penetrate the filter (higher overall penetration %) than at lower flow speeds. The 2 different curves shown in the figure show the penetration difference when the filter is challenged with two different particle sizes 0.3 microns (300 nm) and the MPPS for the filter. The particle size that is hardest for the filter to stop (highest penetration %) is called the most penetrating particle size or "MPPS" which in many HEPA filters is close to 0.3 microns (300 nm) but not exactly 0.3 microns as shown with this figure.

FIGS. 8A and 8B summarize qualitative observations (the number of draws, the resistance felt, smoke level felt, heat index, and notes) provided by subjects smoking nicotine through N95, ULPA or HEPA filters as a (A) 1 inch (surface area=5.07 $cm^2$) flat sheet sample or (B) 2 inch (surface area=20.27 $cm^2$) flat sheet sample.

FIG. 9 provides test results of different filter cartridges comprising different filter types.

FIG. 10 provides non-limiting, exemplary, and illustrative filter cartridges with different filter components FIG. 11 provides an exemplary lengths ($L_0$; 4 mm-69 mm) and diameter ($D_0$; 5 mm-49 mm) of a filter cartridge as described herein.

DETAILED DESCRIPTION

The aim of the disclosed invention is to lessen the health risks from smoking by removing a large majority of the fine/ultrafine particulate matter and/or gaseous contaminants generated from smoking. The invention is created to allow the molecular (VOC) components of the smoking substance to pass through (in some cases selectively or tuned) for inhalation so that the user maintains the desired experience from smoking. This method of smoking removes much to virtually all of the potentially harmful particulates and gases from being delivered to the smoking individual creating a healthier and efficient smoking experience.

The disclosed invention is a smoking device that consist mainly of the following components: a loading space for inserting the smoked substance, a contained volume for transporting smoke or vapor to the user, a filtration region downstream and/or upstream of the loading space of the device that incorporates a variety of filtration technologies (MERV rated prefiltration, HEPA, ULPA, activated carbon technology, water/liquid, sieving, condensation, etc.), and a negative pressure generation system (such as: user inhalation, fan and blower, thermal gradient, pump, etc.). The transporting region may also include straightening and diffusive elements that provide laminar smoke transport and cooling as it is transported through the device.

Components
Smoke Generation and Loading Space

The first stage of the device is the loading space which is the region the user loads the smoking substance into for smoke or vapor generation via thermal reaction. The loading space (depending on smoking configuration/style) can accommodate the smoked substance in a variety of forms including but not limited to raw plant form, concentrated wax form, liquid and gel form, etc. Smoke and or vapor is generated from the smoked substance via thermal reaction from one or more of the following mechanisms: direct contact with a flame from lighter or torch, heat conducting element in direct contact with smoking substance in which the heat provided to the conducting element can be generated by conduction/contact with direct flame, resistive heating element (electrical current), controlled combustion inside loading chamber, etc. By conducting material choice and/or tuning of the current supplied to the resistive heating element it is possible to control in an accurate manner the heat and temperature of the smoking substance. This allows for the possibility of not only controlling the form of transported substance (smoke, vapor, gas, etc.) but also allows for potential tunability of the amount of active molecular component released from the smoked substance. In other words it may be possible to optimize the amount of generated active molecular constituents of the smoked surface by controlling the heat and temperature delivered to the substance.

Transport Region (Chassis)

The chassis of the device is designed to smoothly transport the smoked substance through the device into the filtration region and out to the end user. The design is chosen to allow for suitable flow condition, cooling of smoke, and low resistance. The overall dimensions, form, and style of the Chassis will vary depending on the smoking method—pipe, hookah, bong, volcano, paper roll, vaporizer, etc. However, the basic function of the Chassis as mentioned previously will be the same for all smoking methods. The basic structure and components of the disclosed invention is shown in FIG. 1. For nonsmoking applications of molecular delivery of molecules of interest the overall dimensions may differ substantially from what is disclosed herein and it is understood that the embodiments in the displayed images (FIGS. 1-4, 6) are not limiting to the overall scope of the disclosed invention.

Filtration Region

To understand how the disclosed invention can selectively deliver molecular components, it is important to understand how a particulate filter works. A particulate filter typically consists of a large network of closely spaced nonwoven fibers made from a material such as PTFE or PET. The fibers have a certain diameter, porosity (ratio of the number of fibers to the number of vacancies), and thickness that all contribute to the overall filter efficiency or "particle collection" efficiency. Particles in a filter are collected into the filter by one or more of 4 mechanisms. Of the 4 filter collection mechanisms three are mechanical in nature and one is electrical in nature. The 4 trapping mechanisms are: inertial impaction (large particles diverted in to filter fiber due to inability to follow airstream), interception (particles are intercepted/caught in between filter fibers), diffusion (particles small enough to interact with air molecules "random walk" into a filter fiber), and electrostatic attraction (fibers are charged and collect oppositely charged particles). Large particles are usually collected into filter by inertial impaction and interception mechanisms while smaller particles are collected mainly by diffusion; electrostatic collection does not favor any particular particle size and can therefore be used to collected both large and small particles. Apart from the size, the velocity of the particles riding on the airstream at the filter has a large impact on the collection efficiency of the filter. An increase in velocity also increases the overall kinetic energy at the surface of the filter. This increase in energy makes it easier for particles to penetrate the filter and thus decreases the collection efficiency. It is important to understand that particulate filters work well for airborne particles having a wide range of sizes and shapes however, they do not work well against trapping and preventing airborne molecules and VOCs from breaching the filter. The disclosed invention takes advantage of this shortcoming in particulate filtration to allow the molecular particles of interest to pass through the filtration region of the device freely and independent of the majority of the particulates that are also present in the system. When considering the proper design dimensions we consider the user experience. The user needs low resistance when using the device as well as a reasonable filter lifetime. Below is a brief discussion of how this is controlled for the disclosed invention.

Using a lower face velocity produces a lower pressure drop on the system. A lower system pressure drop means that there will be less resistance experienced from the negative pressure generator (for smoking application the user will have an easier time pulling flow through the device). A low face velocity can be achieved by increasing the surface area of one or more of the filter(s) by pleating. The face velocity is directly proportional to the volumetric flow rate (Q) and inversely proportional to the surface area ($A_s$) of the filter as shown in the equation below $$v = \frac{Q}{A_s}.$$

The surface area ($A_s$) of a filter is greatly increased by pleating. The surface area of a pleated filter can be calculated using the following expression (for 1 filter):

$$A_s = 2 * L * W * d * \frac{\# \text{ pleats}}{\text{inch}}$$

Where L is the length of the pleated filter, W is the width of the pleated filter, d is the pleat depth, and #pleats/inch represents the pleat density. The equation shows that the surface area is directly related to the number of pleats present on the surface so increasing the amount of pleats increases the overall surface area and decrease the face velocity. As an example consider a 1 inch diameter piece of filter material inline of smoke particles being delivered at a flow rate of 25 LPM. The area of the unpleated filter material in this example is 0.785 in² and the face velocity of the smoke on the surface of the filter is 82 cm/s. Now consider that the filter media has been pleated (10 pleats per inch at a pleat depth of 0.4 inches) and made to fit into a 1 inch diameter space and also inline with 25 LPM smoke. In this situation, the pleated filter material has a surface area of 6.28 in² (8 times larger than the unpleated filter) and the face velocity at the surface is reduced to 10.28 cm/s. From this example the benefits of pleating are clearly shown from the increase in filter area and the decrease in face velocity at the surface of the filter. An additional benefit to having a larger filter area is that the life time of the filter will be extended.

Figure 4:
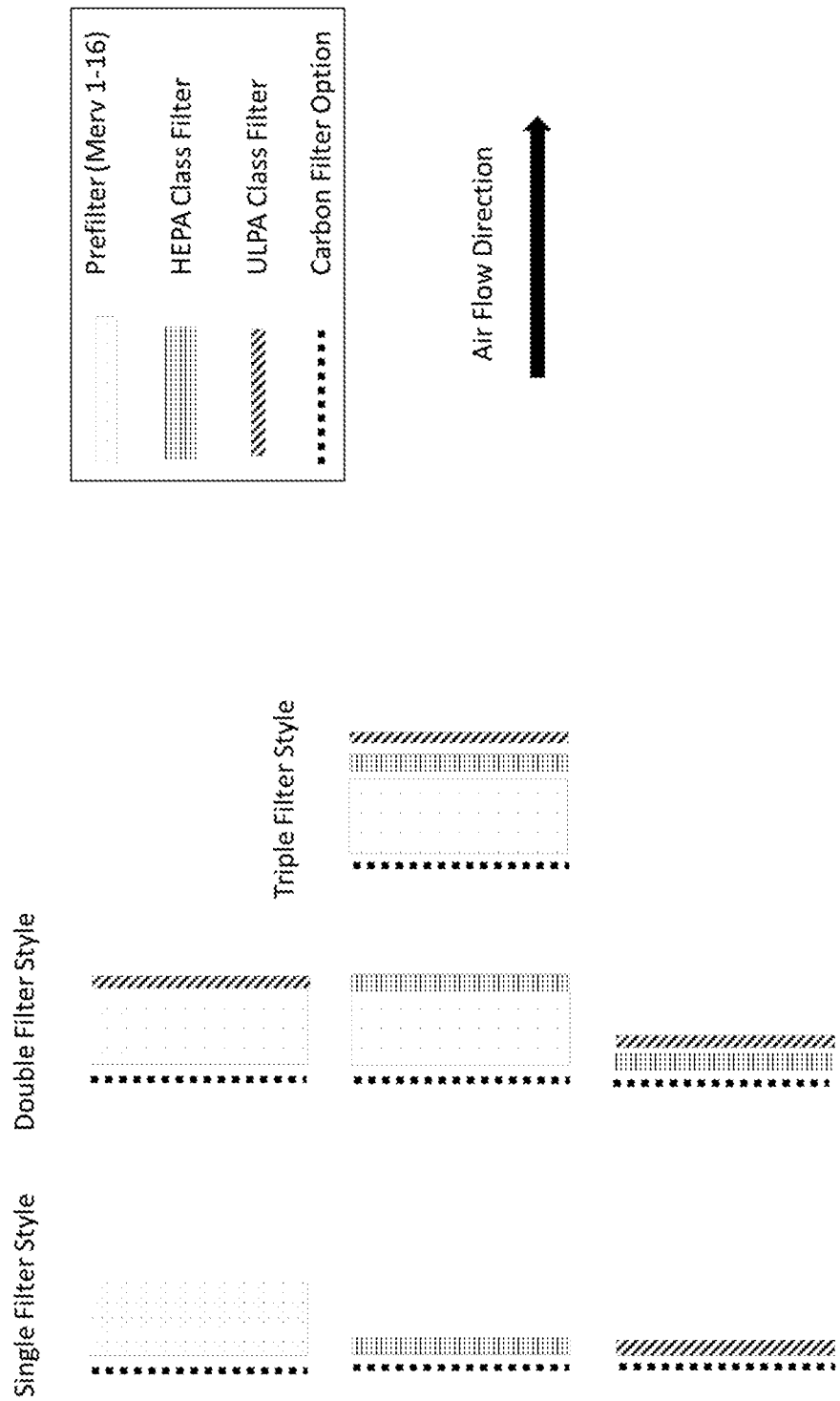

Depending on the configuration of the filtration region of both pleated and/or unpleated version of single, double, and triple styles incorporating any of the possible configurations including copleating shown (and unshown) in FIG. 4 the total filter area will range from 1 square inch-50 square inches depending on the configuration. The face velocity of the filter(s) will range from 0.2 cm/s-300 cm/s depending on the configuration. The preferred face velocity range will be 0.2 cm/s-6 cm/s. The pleat density can range between 0-17 pleats per inch and the pleat depth can range between 0.1 inches-2 inches with preferred ranges of 10-15 pleats per inch and 0.3 inches-0.6 inches for pleat depth.

The device is not limited to the use of ULPA type filters furthest downstream and can also incorporate the use of HEPA (high-efficiency particulate air) filter membrane, glass fiber (such as borosilicate) membrane, ultra-high molecular weight polyethylene (UHMW) membrane, or any other filter material that provides filtration efficiency in the range of 95%→99.999999% for particulate matter sizes less than 300 nm in diameter at face velocities between 0.2 cm/s-300 cm/s.

The prefilter can be made with PTFE, HEPA class filters, PET, PP, activated carbon, impregnated activated carbon (any type), or any combination of the listed materials that have a performance range from Merv 1-16. These materials may (but not required) also be electrostatically charged. The pre filter is also not limited to a single pleated or sheet of material and can be co-pleated or laminated with any of the listed materials for combined benefits.

Negative Pressure Generation

Passive Type:

The device in this configuration generates negative pressure via user's inhalation pressure via lung expansion which transports the smoke through out the system until it finally arrives downstream of the filtration region and is transported into the users lungs.

Active Type:

The device in this configuration generates either negative or positive pressure in a pull or push (respectively) configuration via a fan (axial, centrifugal, etc.), blower, thermal gradient, pump, or other mechanical device.

The disclosed device can be designed to transport the substance (smoke, vapor, gas, liquid, etc.) using either individually or any number of combinations of active and passive type transport mechanisms.

Design Considerations

Figure 5:
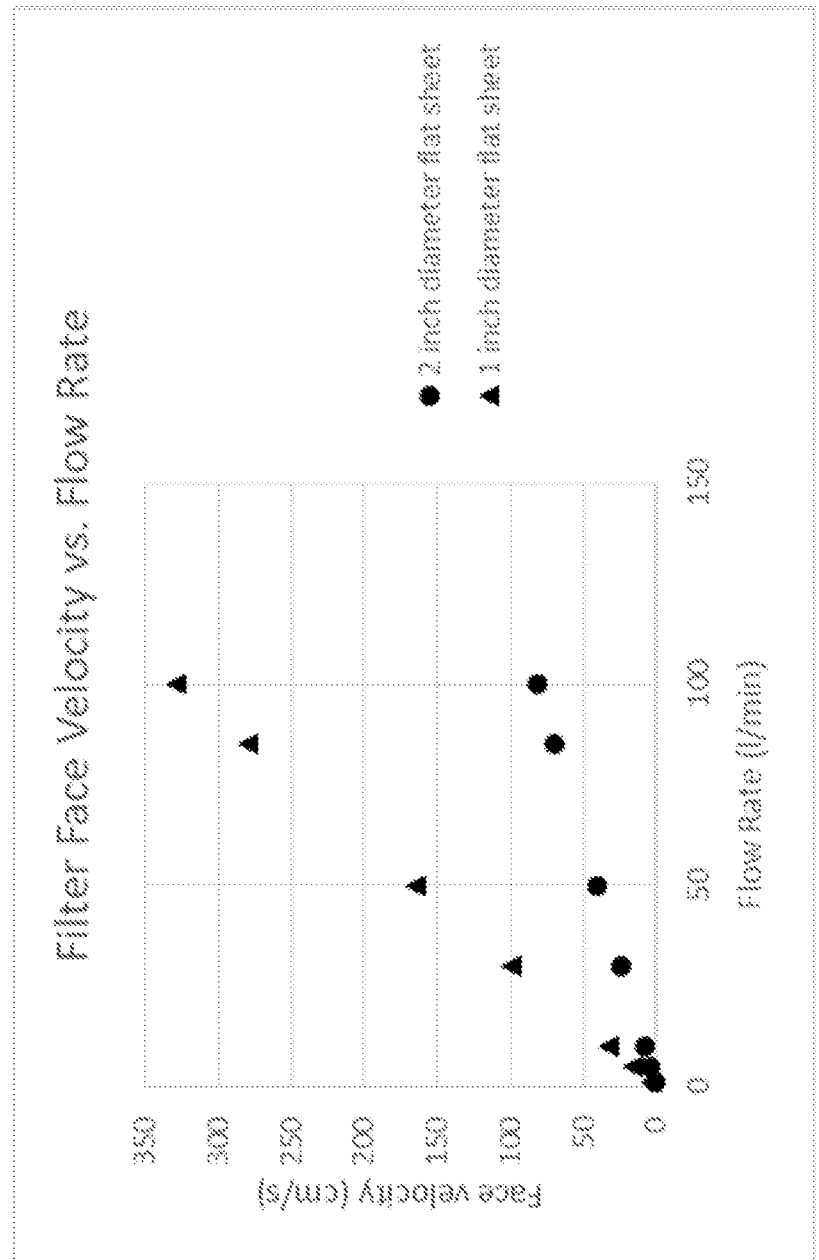

The dimensions of the device are designed according to the following: desired filtration efficiency downstream of the filtration region, total system pressure drop, and ergonomics related to the device's smoking application (individual use, single use, multi-use, portability, group usage, etc.). As mentioned previously the filter face velocity is an important parameter to measure and consider in the design since it affects the device: efficiency, pressure drop (resistance), and system flow rate. FIG. 5 is a graph of various filter face velocities as a function of flow rate that are relevant to the preferred dimensions of the disclosed device when used for the smoking application.

FIG. 5 shows that the face velocity (as well as pressure drop/resistance) is much lower when the area of the filter is increased from 1 inch diameter to 2 inch diameter. This demonstrates the importance of increasing the filter area within the filtration region of the system. One important way to increase the filter area is by pleating the filter(s).

The following equation is used to determine the filter face velocity as a function of filter surface area:

$$v=Q/A_s$$

where v is the filter face velocity, Q is the volumetric flow rate of the air stream entering the filter, and $A_s$, is the surface area of the filter. The equation above shows the direct proportionality between the filter face velocity (effects the system resistance) and the total surface area of the filter(s) in the filtration region of the device. This expression shows that to improve the resistance in the system at any given flowrate (Q) the surface area of the filters must be increased.

Design Parameters of the Preferred Embodiment

Figure 2:
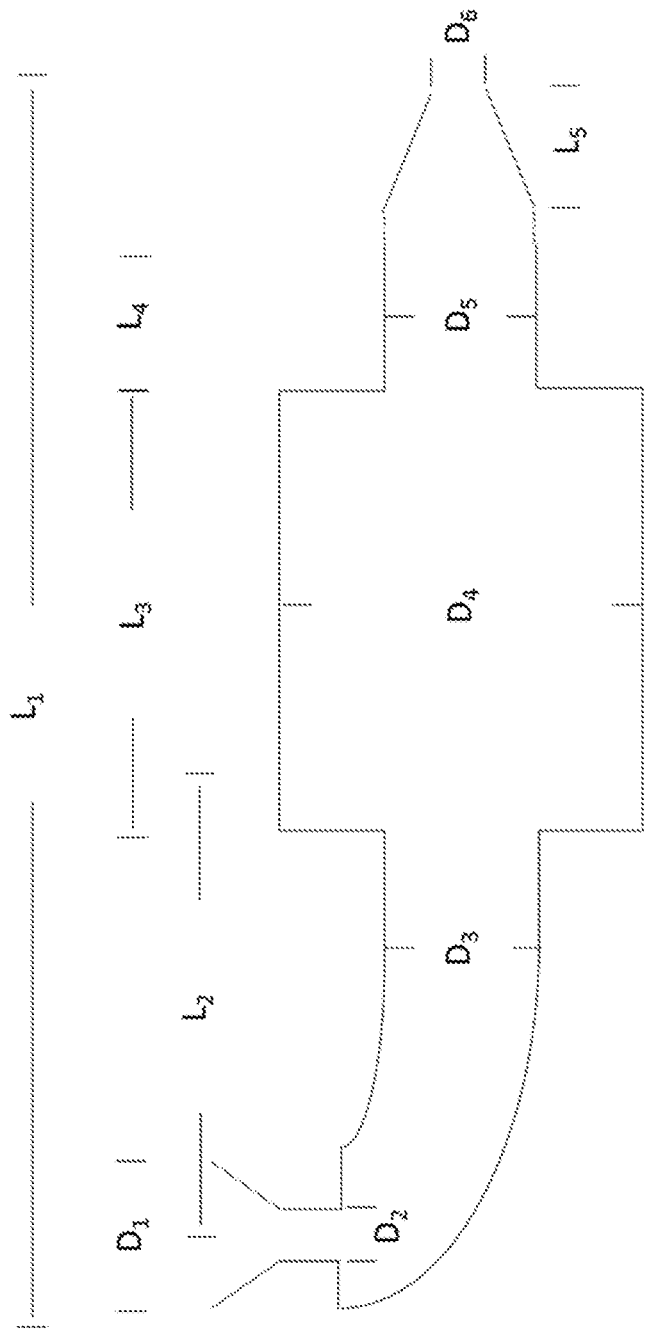
Figure 2:
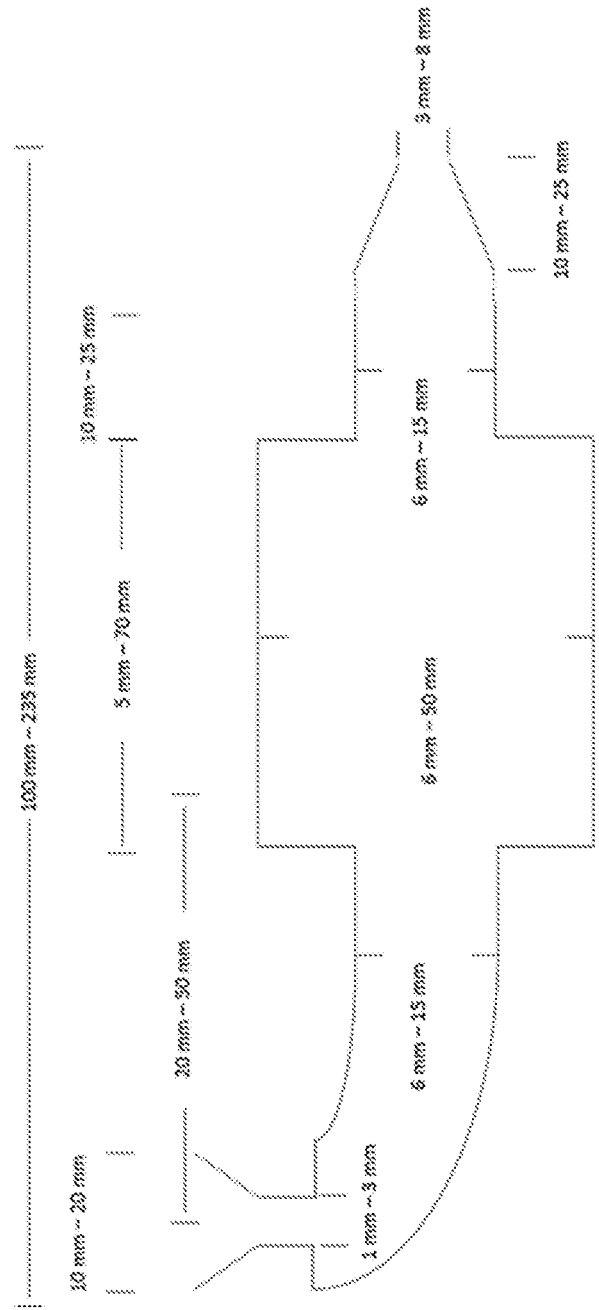
Figure 3:
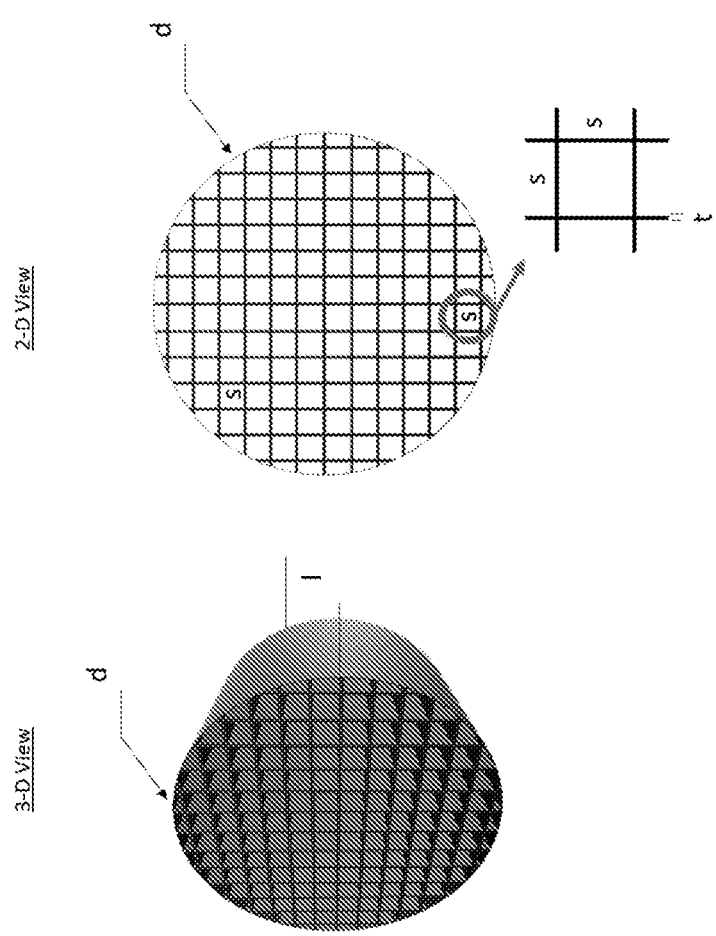

In the preferred embodiment the system contains the following components: a loading space for inserting the smoked substance, a contained volume for transporting smoke or vapor to the user, a filtration region downstream and/or upstream of the loading space of the device that incorporates a variety of individual and/or combinations of the a variety of filtration technologies (MERV rated prefiltration, HEPA, ULPA, activated carbon technology, water/liquid, sieving, condensation, etc.), and a negative pressure generation system (such as: user inhalation, fan and blower, thermal gradient, pump, etc.). In the preferred embodiment the negative generation system is the user inhaling with the expansion of their lungs. The transporting region may also include straightening and diffusive elements that provide laminar smoke transport and cooling as it is transported through the device. This system is a passive system and the components are shown in FIG. 1. FIG. 2 provides exemplary and acceptable size ranges for the system as a whole when used in a smoking application and FIG. 3 provides the dimensions for the optional straightening/diffusive element, which may have an overall diameter of 6 mm-50 mm, length of 0.2 mm-30 mm, an "s" range of 0.5 mm-5 mm, and a "t" range of 0.2 mm-1 mm. In the preferred embodiment, the preferred value for the "s" parameter is 4 mm and for the "t" parameter the value is 0.5 mm.

Preferred Embodiment for a Pipe Smoking Application

FIG. 6 illustrates the preferred embodiment when the invention is used for pipe smoking. The device is a 2-part construction that separates the loading and transport region of the device from the intake/mouthpiece region. The two main regions are separated by at least 1 filter cartridge which is replaceable for the user. In the pipe smoking application, the device consists of the components shown (but not limited) in FIG. 6 which are: loading space/bowl with hole(s) for smoke transport, vent hole or mixer intake region, transport region, filter cartridge(s), and mouthpiece. The loading space or bowl serves as a loading space for the user to place smoking substance. The ideal loading volume of the loading space ranges (not limited) between 1-5 cubic centimeters. The loading space in the preferred embodiment is constructed out of an insulating material (not limited) such as: glass, ceramic, porcelain, wood (briar, beach wood, cherry wood, etc.), clay, brylon, calabash, and corncob. The loading space may also be constructed from conductive materials like metal in alternate configurations of the device. The loading space can be either permanently attached to the transport region or detachable. When the loading space is detachable it can have at least 1 O-ring gasket placed around the bottom portion to create an air tight seal with the mating surface. The vent hole/mixer in the preferred embodiment is placed near the loading space to allow outside air to mix with the smoked substance which lowers the pull resistance associated with smoking as well as assisting with cooling the smoked substance to a lower temperature. The transport region serves as the compartment within the device that delivers the unfiltered smoke to the filter cartridge. The transport region also helps with cooling the smoke and filtering out large particles from the smoke before entering the filter cartridge. The ideal length of the transport region ranges between 10-100 mm. The filter cartridge in the preferred embodiment has diameter that ranges from 1-2 inches. The filter area will range between 5 and 24 square inches. The mouthpiece in this embodiment is shown as one continuous piece which serves as an interaction point for the user however, in other embodiments the mouthpiece can be divided into two separate pieces which when connected together form the mouthpiece shown in FIG. 6.

The fully constructed form of the preferred embodiment of the device for smoking application is shown in FIG. 6. The fully constructed pipe is not limited to the piecewise configuration displayed in FIG. 6 and can also be 1 completely continuous piece with the filter permanently attached. The materials of construction of this continuous pipe can be any combination (but not limited) of the following: glass, ceramic, porcelain, wood (briar, beach wood, cherry wood, etc.), clay, brylon, calabash, corncob, plastic (HDPE, LDPE, HIPS, etc.).

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

EXAMPLES

Example 1

Molecular Delivery of Active Components By Selective Filtration

As an example it was shown in a study published in the Journal of Cannabis Therapeutics, Vol. 4(1) 2004 entitled "Cannabis Vaporizer Combines Efficient Delivery of THC with Effective Suppression of Pyrolytic Compounds" it was shown by quantitative analysis using HPLC-DAD-MS (High Performance Liquid Chromatograph-Diode Array-Mass Spectrometry) and GC/MS (Gas Chromatograph/Mass Spectrometer) techniques to examine both the solid and gas phase of both smoke and vaporized cannabis plant samples they discovered that the active components (Cannabinoids) where present in both the gas and solid phase.

We take advantage of selective filtration technology to pass through active components in the gas phase and capture the solid phase or ("tars") from the air stream. This example shows the progression of testing that led to the final filter cartridges. To prove out the viability of molecular delivery we used a three stage approach. We first selected high efficiency filter material (of various types) and performed industry standard flat sheet testing on the media to validate its quality and performance. The second step was to construct a custom smoking apparatus that could be used to test the effectiveness of the flat sheet material when used in a smoking application. The third and final step was to use the information gained from step two to construct high quality samples that could be used in real devices and tested for filtration performance, lifetime, comfort (draw resistance and heat), and overall user experience (qualitative effect from active components and tastes of flavors).

Step 1: Quality and Performance of Industry Standard Flat Sheet

Figure 7A:
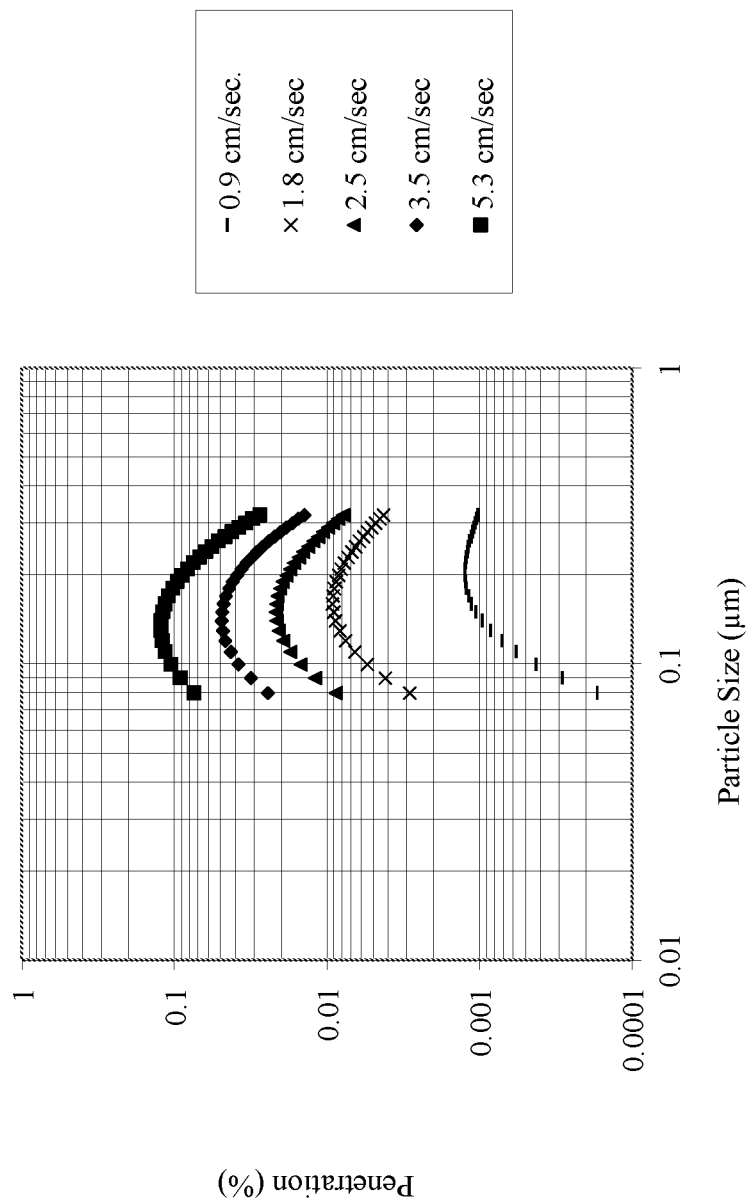
Figure 7B:
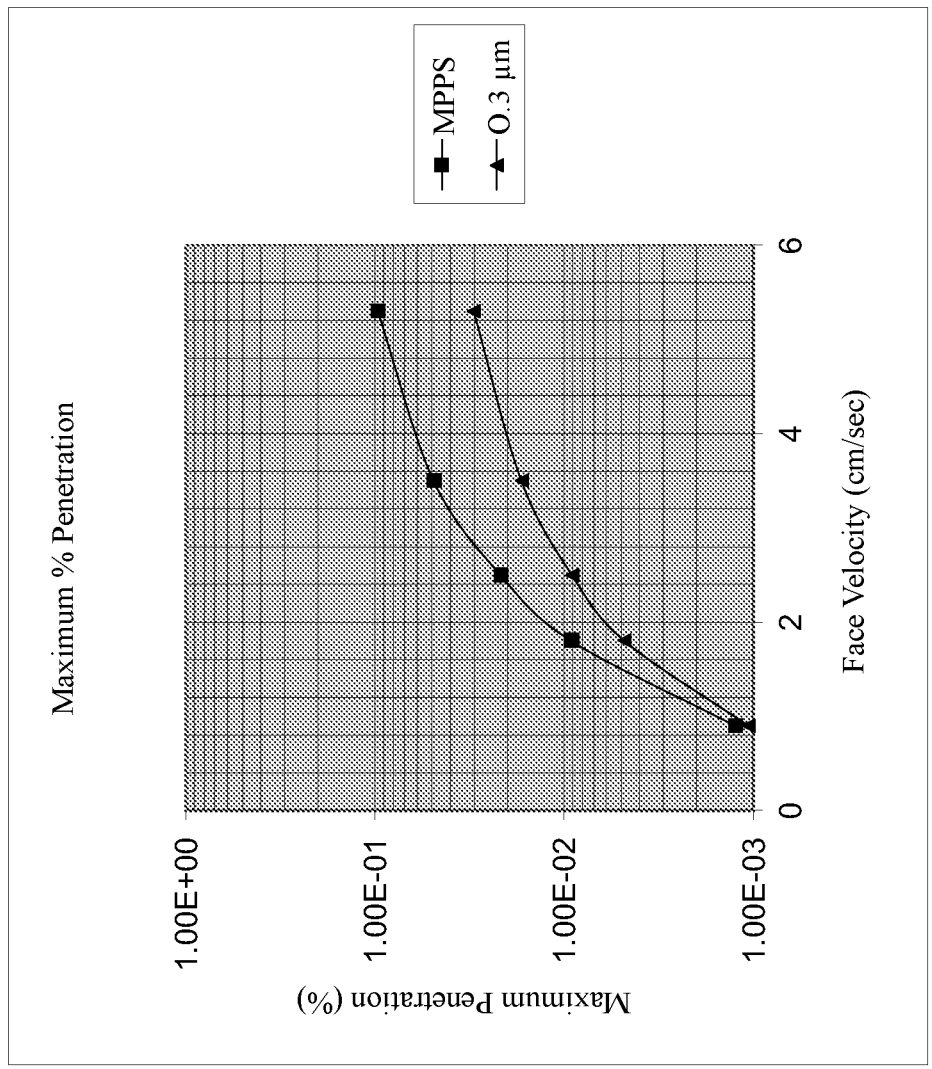
Figure 10:
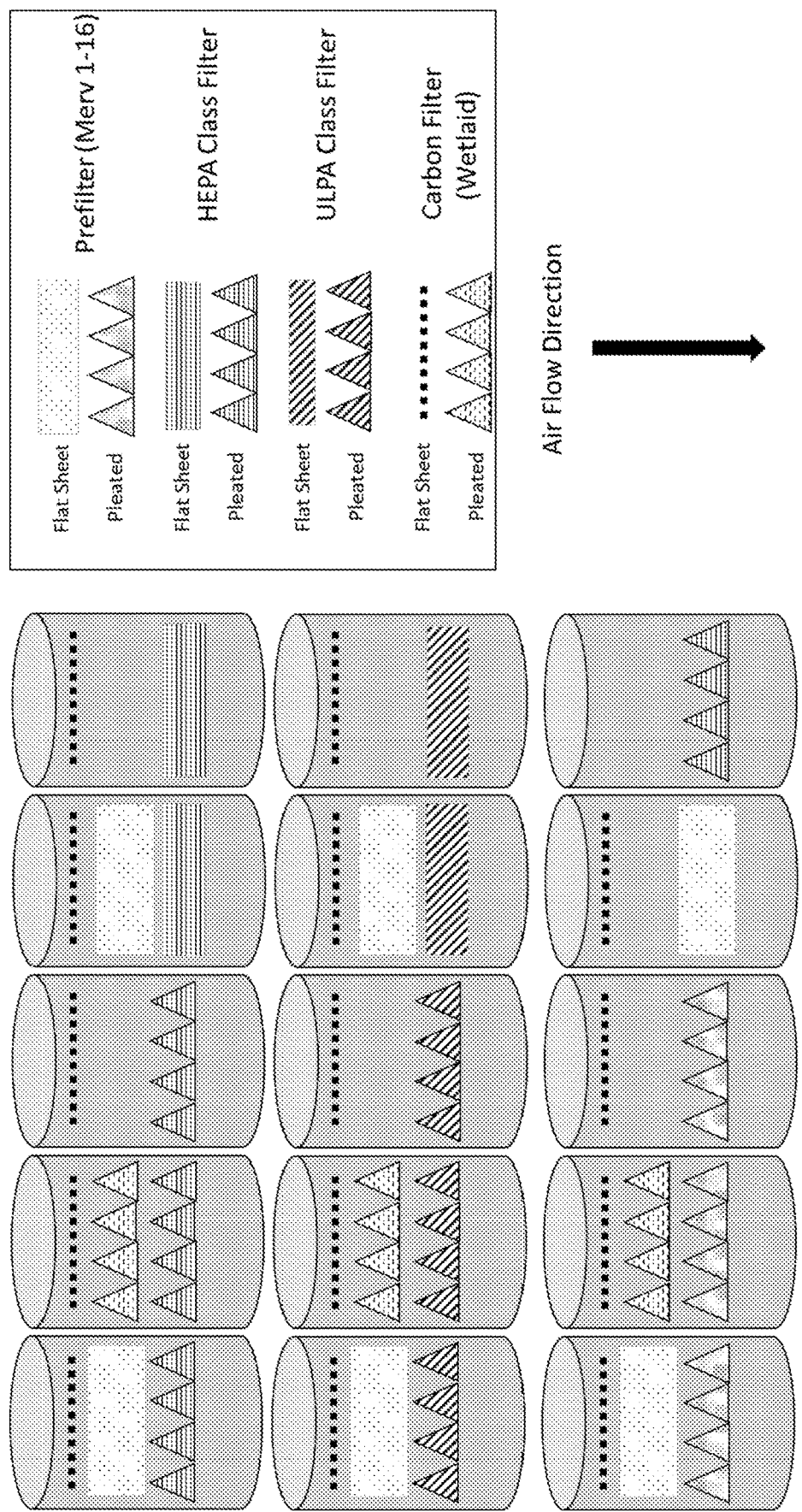
Figure 11:
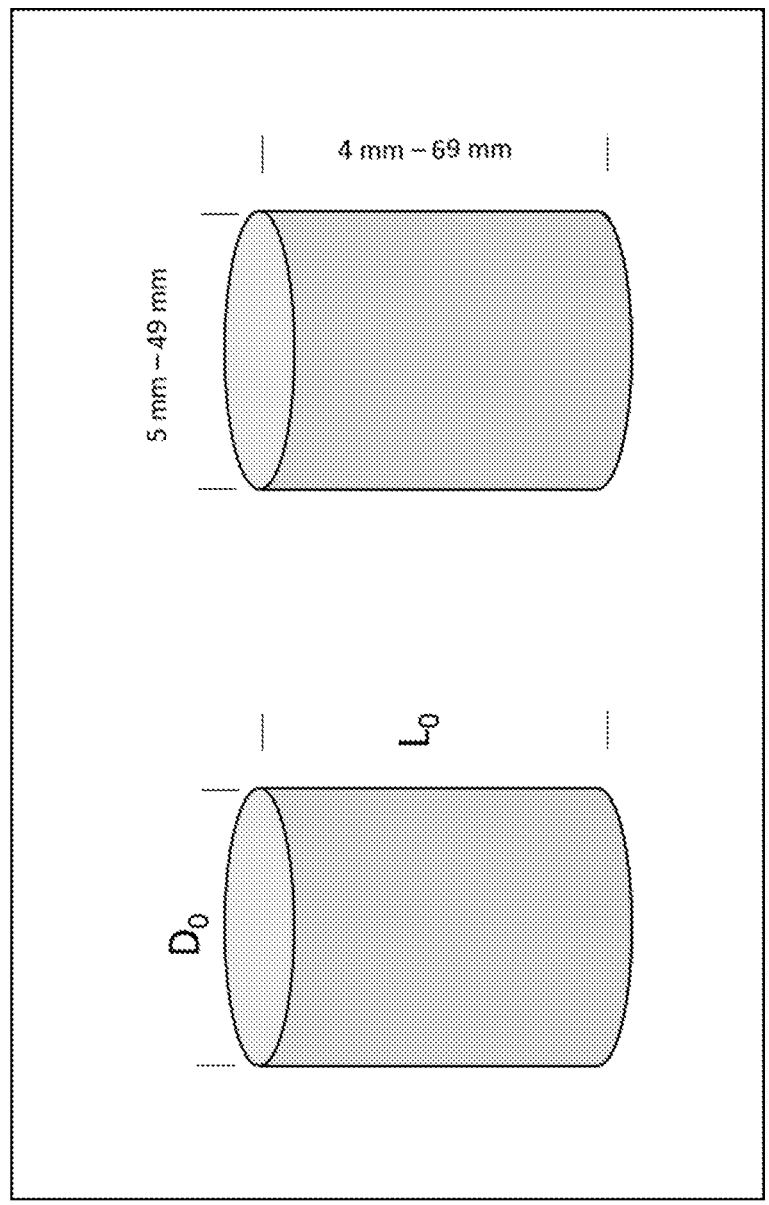

Shown in FIGS. 7A and 7B, and Tables 2 and 3 are results of the initial testing of HEPA grade filter material used for testing and assembling molecular filter cartridges. This was used to verify the quality of the filters before real use.

TABLE 2

| | Max % Penetration | |
|---|---|---|
| Face Velocity (cm/sec) | MPPS | 0.3 μm |
| 0.9 | 1.24E−03 | 1.06E−03 |
| 1.8 | 9.13E−03 | 4.78E−03 |
| 2.5 | 2.16E−02 | 9.08E−03 |
| 3.5 | 4.88E−02 | 1.68E−02 |
| 5.3 | 9.62E−02 | 3.00E−02 |

TABLE 3

| | Minimum % Efficiency | |
|---|---|---|
| Face Velocity (cm/sec) | MPPS | 0.3 μm |
| 0.9 | 99.9% | 99.9% |
| 1.8 | 99.1% | 99.5% |
| 2.5 | 97.8% | 99.1% |
| 3.5 | 95.1% | 98.3% |
| 5.3 | 90.4% | 97.0% |

Step 2: Qualitative Testing of Flat Sheet Filter Material

Shown in FIGS. 8A and 8B respectively are qualitative observations of smoking through 1 inch and 2 inch flat sheets of different types of media (N95, ULPA, HEPA, wetlaid carbon, etc.) Particulates ("tars") captured by the filter during use were captured and seen as brown circles in the middle of each filter (data not shown).

The observations summarized in FIGS. 8A and 8B demonstrated that air drawn through highly efficient filter media that void of particulates but full of flavor. The test also showed that this filtered smoke stream provided the desired physiological effects one would experience from the active chemical component (nicotine) of the smoked substance. These observations are evidence that flavors and active components of the smoked substance pass through the filter freely in molecular form while the airborne particles are trapped in the filter.

Step 3: Subsequently, the Surface Area of the Tested Sample Media was Increased to Determine Whether the Draw Resistance could be Lowered and Use Time Increased while Simultaneously Maintaining Filtration Levels.

FIG. 9 shows the particulate removal efficiency test results for 24 filter cartridges (without wetlaid carbon prefilter) as described herein. Six samples of four different mechanical filtration technologies where challenged with the aerosol DEHS (di-ethylhexyl sebacate) an oily sticky substance for particulate removal efficiency performance. The HEPA glass, ULPA, and Sub HEPA filter cartridges each had a pleat density of 11 pleats/inch and a pleat height of 0.6 inches. The HEPA membrane filter cartridges had a pleat density of 15 pleats/inch and a pleat height of 0.5 inches. The differences are mainly due to the thickness and stiffness of the material used in creating the cartridges, meaning that the HEPA membrane material was less stiff and thick than the other technologies and thus easier to form pleats which resulted in a higher number.

We learned from the previously mentioned qualitative experiments that a flat sheet of filter material from these various mechanical filtration technologies (HEPA glass in this example) with an opening equal (1 inch diameter) and double (2 inch diameter) to the tested filter cartridges would only allow the user to successfully draw airflow through the filter ~3 to 6 times before the resistance was too high to draw airflow through. When pleated (11 pleats/inch) the HEPA glass material in a 1 inch diameter opening was able to accomplish an excess of 30 draws before the resistance was too high. The amount of surface area of flat sheet filter material for the 1 inch diameter test was 5.07 cm$^2$ and for the pleated cartridge with the same 1 inch diameter opening the surface area was 64.2 cm$^2$. In other words, ten times the amount of material resulted in over ten times the lifetime performance. However, this correlation was not observed when increasing the surface area of flat sheets. The expected decrease in draw resistance was observed when a 2 inch flat sheet (20.3 cm$^2$) was used compared to a 1 inch (5.07 cm$^2$) flat sheet. However, a 4× increase in lifetime (number of draws) was not seen from the 4× increase in surface area. As a result, even though we expected some increase in overall lifetime, it was not immediately obvious that increasing the surface area from pleating would have the favorable linear increase with surface area which was not observed with the flat sheet testing. Such observations are not expected, as it is well known and accepted in the filtration industry that mechanical particulate filters such as the sub HEPA, HEPA, and ULPA filters do not protect against gasses and vapors/fumes which have molecular sizes that are less than 10 nm in diameter. It is also understood that smoke/vapor (from vaporizer devices) contain a mixture of particulates and gasses in which both phases have the active molecular components and flavors present. Currently in the smoking/vaping industry inhalation filters are not pleated. The possibility of achieving acceptable use lifetimes (number of draws) in small size filters (1 inch or less in diameter) that have particulate efficiencies in the range of 90%-99.999% is not obvious nor presently achieved in the industry.

With this knowledge, we speculated that it was possible to achieve molecular delivery of these active components through a particulate filtered air stream. Our initial qualitative test results show that this is almost certainly the case however, we plan to support this claim of molecular delivery by testing the downstream filtered air stream (via accepted probing methods such as GC/MS and HPLC) for the active molecular components and flavors.

Nonlimiting embodiments include the following.

Embodiment 1: An apparatus for selectively delivering molecular active components from bulk airborne substances comprising: a loading space for inserting the smoked substance; a contained volume for transporting smoke or vapor; a filtration region downstream and/or upstream of the loading space of the device that incorporates a variety of individual and/or combinations of filtration technologies (MERV rated prefiltration, HEPA, ULPA, activated carbon technology, water/liquid, sieving, condensation, etc.) with the downstream filtration region comprised of a filter combination capable of removing fine/ultrafine particulates to a filtration efficiency in the range of 95%→99.999999% for particulate matter sizes less than 300 nm in diameter at face velocities between 0.2 cm/s-300 cm/s so that the smoke that leaves the filtration region is no longer visible to the human eye; a negative pressure generation system (such as: user inhalation, fan and blower, thermal gradient, pump, etc.).

Embodiment 2: The apparatus of embodiment 1 further comprising: a transporting region a straightening and diffusive elements to provide laminar smoke transport and cooling as it is transported through the system.

Embodiment 3. The apparatus of embodiment 1 further comprising: a loading space/chamber for vaporizing the substance (using a heating coil/wire or resistive element).

Embodiment 4. The apparatus from claim 2 further comprising: a loading space/chamber for vaporizing the substance (using a heating coil/wire or resistive element).

Embodiment 5. The apparatus of embodiment 1 further comprising: at least one differential pressure sensor to measure the pressure drop across the filtration region to monitor the resistance/lifetime of the filter; an additional pressure sensor to quantify the flow rate of the system; a known fixed resistance (cone, orifice, etc.) that would have the pressure drop measured across; a user interface for displaying relevant information such as data collected from the pressure sensors which includes filter lifetime and flowrate, and a negative pressure generation system (such as: user inhalation, fan and blower, thermal gradient, pump, etc.).

Embodiment 6. The apparatus of embodiment 2 further comprising: at least one differential pressure sensor to measure the pressure drop across the filtration region to monitor the resistance/lifetime of the filter; an additional pressure sensor to quantify the flow rate of the system; a known fixed resistance (cone, orifice, etc.) that would have the pressure drop measured across; a user interface for displaying relevant information such as data collected from the pressure sensors which includes filter lifetime and flowrate, and a negative pressure generation system (such as: user inhalation, fan and blower, thermal gradient, pump, etc.).

Embodiment 7. The apparatus of embodiment 5 further comprising: a Bluetooth chip to allow the device to display information to a Bluetooth compatible device such as a smart phone, laptop computer, tablet, etc.

Embodiment 8. The apparatus of embodiment 6 further comprising: a Bluetooth chip to allow the device to display information to a Bluetooth compatible device such as a smart phone, laptop computer, tablet, etc.

Embodiment 9. The apparatus of embodiment 3 further comprising: at least one differential pressure sensor to measure the pressure drop across the filtration region to monitor the resistance/lifetime of the filter; an additional pressure sensor to quantify the flow rate of the system; a known fixed resistance (cone, orifice, etc.) that would have the pressure drop measured across; a user interface for displaying relevant information such as data collected from the pressure sensors which includes filter lifetime and flowrate, and a negative pressure generation system (such as: user inhalation, fan and blower, thermal gradient, pump, etc.).

Embodiment 10. The apparatus of embodiment 4 further comprising: at least one differential pressure sensor to measure the pressure drop across the filtration region to monitor the resistance/lifetime of the filter; an additional pressure sensor to quantify the flow rate of the system; a known fixed resistance (cone, orifice, etc.) that would have the pressure drop measured across; a user interface for displaying relevant information such as data collected from the pressure sensors which includes filter lifetime and flowrate, and a negative pressure generation system (such as: user inhalation, fan and blower, thermal gradient, pump, etc.).

Embodiment 11. The apparatus of embodiment 9 further comprising: a Bluetooth chip to allow the device to display information to a Bluetooth compatible device such as a smart phone, laptop computer, tablet, etc.

Embodiment 12. The apparatus of embodiment 10 further comprising: a Bluetooth chip to allow the device to display information to a Bluetooth compatible device such as a smart phone, laptop computer, tablet, etc.

Embodiment 13. The apparatus of embodiment 5 further comprising: a condensation chamber for converting the airborne molecular active components into liquid form for extraction.

Embodiment 14. The apparatus of embodiment 6 further comprising: a condensation chamber for converting the airborne molecular active components into liquid form for extraction.

What is claimed is:

1. A smoking apparatus, comprising:
   a first section comprising:
     a loading space; and
     a transport region immediately downstream of the loading space;
   a second section comprising a negative pressure generation system; and
   a filtration region immediately downstream of the transport region and between the negative pressure generation system and the transport region, the filtration region comprising a filter cartridge for selective delivery of molecular active components from bulk airborne substances to a user, the filter cartridge comprising:
     a pleated flat sheet that comprises filter material, wherein the pleated flat sheet comprises a pleat density of up to 17 pleats per inch, a pleat depth between 0.1-2 inches, and a pleat height of 0.3-3 inches, wherein the filter cartridge provides a filtration efficiency of 95% or greater for particulate matter sizes less than or equal to 300 nm in diameter at all face velocities in a range that extends from 0.2 cm/s to 6 cm/s; and
   a first diffusive element located in the transport region to provide laminar air flow and cooling through the transport region, the first diffusive element comprising a plurality of walls that intersect to form a plurality of rectangles in a grid shape at an interior of the first diffusive element, wherein each rectangle comprises a part of a first wall that intersects a part of a second wall, wherein a length of the part of the first wall and a length of the part of the second wall are in a range of 0.5 mm to 5 mm,
   wherein the first section comprises a first part of the filtration region that includes a first opening,
   wherein the second section comprises a second part of the filtration region that includes a second opening,
   wherein the filter cartridge occupies the first opening or the second opening,
   wherein the first part of the filtration region and the second part of the filtration region are sized to mate with one another to connect the first section and the second section to one another, and
   wherein, when the first section and the second section are connected to one another and assembled with the filter cartridge, the filter cartridge overlaps with both of the first section and the second section in a plan view.

2. The filter cartridge of claim 1, wherein the filter material is selected from the group including a high-efficiency particulate air (HEPA) filter membrane, a HEPA glass fiber membrane, ultra-high molecular weight polyethylene (UHMW) membrane, an ULPA filter membrane, a sub-HEPA filter membrane, or any combination thereof.

3. The filter cartridge of claim 1, wherein the pleated flat sheet comprises a HEPA glass fiber membrane, an ULPA filter membrane, a sub-HEPA filter membrane, or any combination thereof, and wherein the pleated flat sheet comprises a pleat density of 11 pleats/inch and a pleat height of 0.5 inches.

4. The filter cartridge of claim 1, wherein the pleated flat sheet comprises a HEPA filter membrane, and wherein the pleated flat sheet comprises a pleat density of 15 pleats/inch and a pleat height of 0.5 inches.

5. The filter cartridge of claim 1, further comprising a prefilter.

6. The filter cartridge of claim 5, wherein the prefilter comprises PTFE, HEPA class filters, PET, PP, activated carbon, impregnated activated carbon, or any combination of the listed materials, and wherein the prefilter has a performance range from MERV 1-16.

7. The filter cartridge of claim 5, wherein the prefilter comprises wetlaid carbon.

8. The smoking apparatus of claim 1, wherein the molecular active components delivered through the filter material include nicotine.

9. A smoking apparatus comprising:
   a first section comprising:
     a loading space; and
     a first transport region immediately downstream of the loading space;
   a second section comprising a negative pressure generation system; and
   a filtration region immediately downstream of the first transport region and between the negative pressure generation system and the first transport region, the filtration region comprising a filter cartridge for selective delivery of molecular active components from bulk airborne substances to a user, the filter cartridge comprising a pleated flat sheet that comprises filter material, wherein the pleated flat sheet comprises a pleat density of up to 17 pleats per inch, a pleat depth between 0.1-2 inches, and a pleat height of 0.3-3 inches, wherein the filter cartridge provides a filtration efficiency of 95% or greater for particulate matter sizes less than or equal to 300 nm in diameter at all face velocities in a range that extends from 0.2 cm/s to 6 cm/s,
   wherein the first section comprises a first part of the filtration region that includes a first opening,
   wherein the second section comprises a second part of the filtration region that includes a second opening, wherein the filter cartridge occupies an entirety of the first opening or the second opening, wherein the first part of the filtration region and the second part of the filtration region are sized to mate with one another to connect the first section and the second section to one another, and wherein, when the first section and the second section are connected to one another and assembled with the filter cartridge, the filter cartridge overlaps with both of the first section and the second section in a plan view; and a first diffusive element located in the first transport region to provide laminar air flow and cooling through the first transport region, the first diffusive element comprising a plurality of walls that intersect to form a plurality of rectangles in a grid shape at an interior of the first diffusive element, wherein each rectangle comprises a part of a first wall that intersects a part of a second wall, wherein a length of the part of the first wall and a length of the part of the second wall are in a range of 0.5 mm to 5 mm.

10. The smoking apparatus of claim 9, wherein the loading space further comprises a tunable heating element that is controlled to generate an amount of heat, wherein the amount of heat generated by the tunable heating element and a type of the filter material of the filter cartridge are selected so that the filter cartridge is rendered unusable after a known number of draws, and wherein a widest part of the pleated flat sheet is from 5 mm to 49 mm wide.

11. The smoking apparatus of claim 9, wherein the negative pressure generation system further comprises a mouthpiece for user inhalation.

12. The smoking apparatus of claim 9, further comprising at least one differential pressure sensor.

13. The smoking apparatus of claim 12, further comprising a Bluetooth chip for communicating lifetime information of the filter cartridge and flowrate information of the filter cartridge for display on an external device, wherein the lifetime information and the flowrate information are determined based on output of the at least one differential pressure sensor.

14. The smoking apparatus of claim 9, further comprising a condensation chamber that converts the molecular active components into liquid form.

15. The smoking apparatus of claim 9, further comprising:
a differential pressure sensor that measures pressure drop across the filtration region to monitor a lifetime of the filter cartridge; and
an additional pressure sensor that measures pressure drop across a known resistance to quantify flow rate of air through the first section or the second section.

16. The smoking apparatus of claim 9, wherein the second section further comprises:
a second transport region between the filtration region and the negative pressure generation system, wherein a diameter of the filtration region is larger than diameters of the first transport region and the second transport region.

17. The smoking apparatus of claim 9, further comprising:
a second diffusive element, wherein the second section further comprises a second transport region between the filtration region and the negative pressure generation system, wherein the second diffusive element is located in the second transport region to provide laminar air flow and cooling through the second transport region, the second diffusive element comprising a plurality of walls that intersect to form a plurality of rectangles in a grid shape at an interior of the second diffusive element, wherein each rectangle comprises a part of a third wall that intersects a part of a fourth wall, wherein a length of the part of the third wall and a length of the part of the fourth wall are in a range of 0.5 mm to 5 mm, wherein thicknesses of the first, second, third, and fourth walls are equal to 0.5 mm.

18. A smoking apparatus, comprising:
a first section comprising:
a loading space; and
a transport region immediately downstream of the loading space;
a second section comprising a negative pressure generation system;
a filtration region immediately downstream of the transport region and between the negative pressure generation system and the transport region, the filtration region comprising a filter cartridge for selective delivery of molecular active components from bulk airborne substances, the filter cartridge comprising:
a pleated flat sheet comprising filter material that occupies an entirety of an opening of a housing when the pleated flat sheet is placed in the opening, wherein a widest part of the pleated flat sheet is from 5 mm to 49 mm wide, wherein the pleated flat sheet comprises a pleat density of up to 17 pleats per inch, a pleat depth between 0.1-2 inches, and a pleat height of 0.3-3 inches, wherein the filter cartridge provides a filtration efficiency of 95% or greater for particulate matter sizes less than or equal to 300 nm in diameter at all face velocities in a range that extends from 0.2 cm/s to 6 cm/s;
a first diffusive element located in the transport region to provide laminar air flow and cooling through the transport region, the first diffusive element comprising a plurality of walls that intersect to form a plurality of rectangles in a grid shape at an interior of the first diffusive element, wherein each rectangle comprises a part of a first wall that intersects a part of a second wall, wherein a length of the part of the first wall and a length of the part of the second wall are in a range of 0.5 mm to 5 mm
a differential pressure sensor that measures pressure drop across the filtration region to monitor a lifetime of the filter cartridge; and
an additional pressure sensor that measures pressure drop across a known resistance to quantify flow rate of air through the first section or the second section,
wherein the first section comprises a first part of the filtration region including a first opening,
wherein the second section comprises a second part of the filtration region including a second opening,
wherein the filter cartridge occupies an entirety of the first opening or the second opening,
wherein the first part of the filtration region and the second part of the filtration region are sized to mate with one another to connect the first section and the second section to one another, and
wherein, when the first section and the second section are connected to one another and assembled with the filter cartridge, the filter cartridge overlaps with both of the first section and the second section in a plan view.

19. The smoking apparatus of claim 18, wherein the pleated flat sheet is circular.

20. The smoking apparatus of claim 18, wherein the molecular active components delivered through the filter material include nicotine.

* * * * *